US010405245B2

(12) United States Patent
Kumar et al.

(10) Patent No.: US 10,405,245 B2
(45) Date of Patent: Sep. 3, 2019

(54) METHOD OF MANAGING E-UTRAN CAPABILITY OF A USER EQUIPMENT

(71) Applicant: Samsung Electronics Co., Ltd., Gyeonggi-do (KR)

(72) Inventors: Lalith Kumar, Bangalore (IN); Bharat Vinayak Bhat, Bangalore (IN); Prasad Basavaraj Dandra, Bangalore (IN); Ricky Kaura, Bangalore (IN); Krishnamurthy Doddaballapur Ramu, Bangalore (IN)

(73) Assignee: Samsung Electronics Co., Ltd (KR)

( * ) Notice: Subject to any disclaimer, the term of this patent is extended or adjusted under 35 U.S.C. 154(b) by 7 days.

(21) Appl. No.: 15/574,423

(22) PCT Filed: May 13, 2016

(86) PCT No.: PCT/KR2016/005120
§ 371 (c)(1),
(2) Date: Nov. 15, 2017

(87) PCT Pub. No.: WO2016/186400
PCT Pub. Date: Nov. 24, 2016

(65) Prior Publication Data
US 2018/0139661 A1    May 17, 2018

(30) Foreign Application Priority Data
May 15, 2015   (IN) .......................... 2465/CHE/2015

(51) Int. Cl.
*H04W 36/00*    (2009.01)
*H04W 36/14*    (2009.01)
(Continued)

(52) U.S. Cl.
CPC ......... *H04W 36/0022* (2013.01); *H04W 8/06* (2013.01); *H04W 8/22* (2013.01);
(Continued)

(58) Field of Classification Search
CPC ... H04W 36/0022; H04W 36/14; H04W 8/06; H04W 8/22; H04W 76/19
See application file for complete search history.

(56) References Cited

U.S. PATENT DOCUMENTS

| 2010/0113010 A1* | 5/2010 | Tenny ..................... H04L 12/66 455/423 |
| 2010/0195616 A1* | 8/2010 | Vikberg ............ H04W 36/0022 370/331 |

(Continued)

FOREIGN PATENT DOCUMENTS

IN    2465/CHE/2015    *   5/2016

OTHER PUBLICATIONS

PCT/ISA/237 Written Opinion issued on PCT/KR2016/005120 (pp. 8).
PCT/ISA/210 Search Report issued on PCT/KR2016/005120 (pp. 3).

*Primary Examiner* — Gary Mui
(74) *Attorney, Agent, or Firm* — The Farrell Law Firm, P.C.

(57) ABSTRACT

A method of managing evolved universal mobile telecommunication system terrestrial radio access network (E-UTRAN) capability of a user equipment (UE) is provided that includes switching from a first radio access technology (RAT) to a second RAT if the first RAT fails to provide circuit switched (CS) services to the UE, the first RAT and the second RAT being associated with a first public landline mobile network (PLMN). The UE establishes a CS call session with the second RAT. In the meanwhile, the UE receives a network handover command to move to a second PLMN. The UE may also perform a movement from the first PLMN to the second PLMN and connect with a third RAT associated with the second PLMN to continue the CS call session. The UE enables the E-UTRAN capability after (Continued)

moving to the second PLMN to connect with a fourth RAT available in the second PLMN.

20 Claims, 11 Drawing Sheets

(51) Int. Cl.
  *H04W 8/06* (2009.01)
  *H04W 8/22* (2009.01)
  *H04W 76/19* (2018.01)
  *H04W 88/06* (2009.01)
  *H04W 48/18* (2009.01)

(52) U.S. Cl.
  CPC ........... *H04W 36/14* (2013.01); *H04W 76/19* (2018.02); *H04W 48/18* (2013.01); *H04W 88/06* (2013.01)

(56) References Cited

U.S. PATENT DOCUMENTS

| | | | |
|---|---|---|---|
| 2010/0216465 A1* | 8/2010 | Mubarek | H04W 48/18 455/435.1 |
| 2010/0279691 A1 | 11/2010 | Dwyer et al. | |
| 2010/0316000 A1* | 12/2010 | Burbidge | H04W 36/0022 370/328 |
| 2012/0071163 A1* | 3/2012 | Klingenbrunn | H04W 48/18 455/435.2 |
| 2012/0202500 A1 | 8/2012 | Wu | |
| 2012/0224563 A1 | 9/2012 | Zisimopoulos et al. | |
| 2013/0237223 A1 | 9/2013 | Hietalahti et al. | |
| 2013/0259004 A1* | 10/2013 | Morita | H04M 7/1205 370/331 |
| 2013/0315203 A1* | 11/2013 | Wong | H04W 36/0022 370/331 |
| 2014/0148169 A1* | 5/2014 | Li | H04W 36/0061 455/437 |
| 2014/0348064 A1* | 11/2014 | Jeong | H04W 48/18 370/328 |
| 2015/0036611 A1 | 2/2015 | Kim et al. | |
| 2015/0124779 A1* | 5/2015 | Liu | H04W 36/0022 370/331 |
| 2016/0057661 A1* | 2/2016 | Nayak | H04W 36/0022 370/331 |
| 2016/0057671 A1* | 2/2016 | Yang | H04W 36/0022 370/332 |
| 2016/0066235 A1* | 3/2016 | Bhat | H04W 36/14 455/436 |
| 2016/0095021 A1* | 3/2016 | Yan | H04W 36/0022 455/437 |
| 2016/0142969 A1* | 5/2016 | Hedman | H04W 36/0022 370/331 |
| 2016/0295489 A1* | 10/2016 | Alonso-Rubio | H04W 36/0022 |
| 2016/0323813 A1* | 11/2016 | Chen | H04W 36/0022 |
| 2016/0337898 A1* | 11/2016 | Jeong | H04W 28/0289 |
| 2016/0373981 A1* | 12/2016 | Axmon | H04W 36/0022 |

\* cited by examiner

METHOD OF MANAGING E-UTRAN CAPABILITY OF A USER EQUIPMENT

PRIORITY

This application is a National Phase Entry of PCT International Application No. PCT/KR2016/005120, which was filed on May 13, 2016, and claims an Indian Provisional Patent Application filed on May 15, 2015 in the Indian Intellectual Property Office and assigned Serial No. 2465/CHE/2015, and an Indian Complete Patent Application filed on May 12, 2016 in the Indian Intellectual Property Office and assigned Serial No. 2465/CHE/2015, the entire contents of each of which are incorporated herein by reference.

BACKGROUND

1. Field of the Disclosure

The present disclosure generally relates to wireless communication. The present disclosure more particularly relates to method of managing E-UTRAN capability of a user equipment.

2. Description of the Related Art

Today, user equipment (UE)'s such as mobile phones, laptops, tablets, and the like and the use thereof have become increasingly popular as communication mediums in a home, office, and/or school environment. Currently, such devices use wireless communication systems with both second generation/third generation (2G/3G) and long term evolution (LTE) capability (fourth generation (4G)) to access data and content. For example, current wireless communication systems include evolved NodeBs (eNodeBs or eNBs) connected to the core network of the wireless communication system. A UE registers with the LTE network for availing evolved packet system (EPS) services from the LTE network. The LTE network is capable of providing both packet switched (PS) and circuit switched (CS) domain related services to the UE. Also, the UE operating in the LTE network can operate in one of the modes including PS mode 1, PS mode 2, PS/CS mode 1 and PS/CS mode 2. For the explanation purpose, the UE operating in PS/CS mode 1 is considered here. The UE operating in PS/CS mode 1 registers with a network for obtaining both EPS and non-EPS services with UE usage setting as "voice centric". So while accessing CS data, the UE switches to a radio access technology (RAT) with 2G/3G capability if the LTE network is not IP multimedia subsystem (IMS) anchored and while accessing PS data, the UE switches to RAT with evolved universal mobile telecommunication system (UMTS) terrestrial radio access network (E-UTRAN) capability.

However, there are problems/difficulties associated with enabling and disabling of RAT capability as it is based on requirement of the user of the UE. The one or more problems associated with enabling and disabling of the UE's RAT capability with examples are shown in FIGS. 1a to 2c.

Figure 1A:
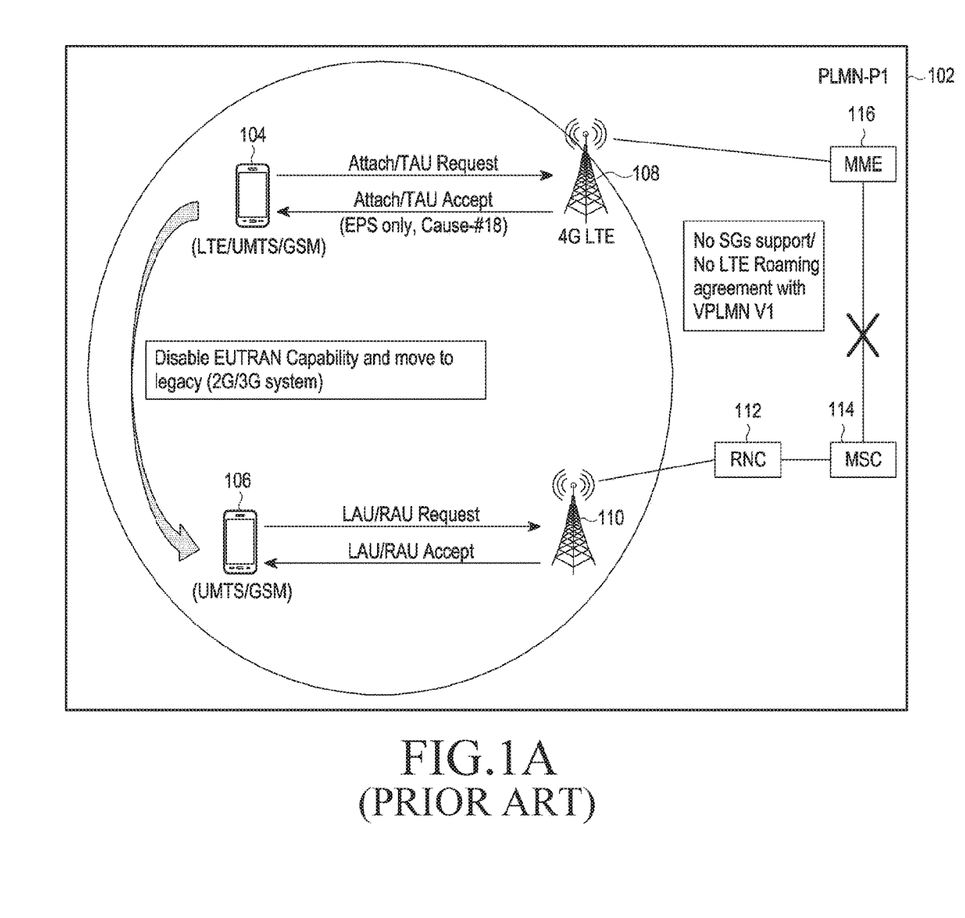
FIGS. 1*a* and 1*b* are schematic diagrams illustrating an exemplary problem scenario in which a user equipment (UE) disables a specific radio access technology (RAT) capability, according to the related art.

FIGS. 1a and 1b are schematic diagrams illustrating an exemplary problem scenario in which a UE disables a specific RAT capability, according to the related art. As shown in FIG. 1a, consider that the UE 104 is capable of operating in PS/CS mode 1 and can access plurality of radio access technologies such as LTE/UMTS/GSM. The UE 104 sends an attach request message or a tracking area update (TAU) request message to a LTE RAT 108 to avail CS services from a public landline mobile network (PLMN), P1 (102). However, the PLMN P1 (102) is not able to provide CS services to the UE 104 and sends accept message with cause #18 via the LTE RAT 108. The cause #18 indicates that CS services are not available in the current PLMN (P1) 102. Hence, the UE 104 disables E-UTRAN capability and detaches from the LTE RAT. The UE 106 then selects 2G/3G RAT 110 of the PLMN (P1) 102 to avail CS services from the 2G/3G RAT 110. The UE registers with the 2G/3G RAT 110 and initiates a PS/CS session with it.

Figure 1B:
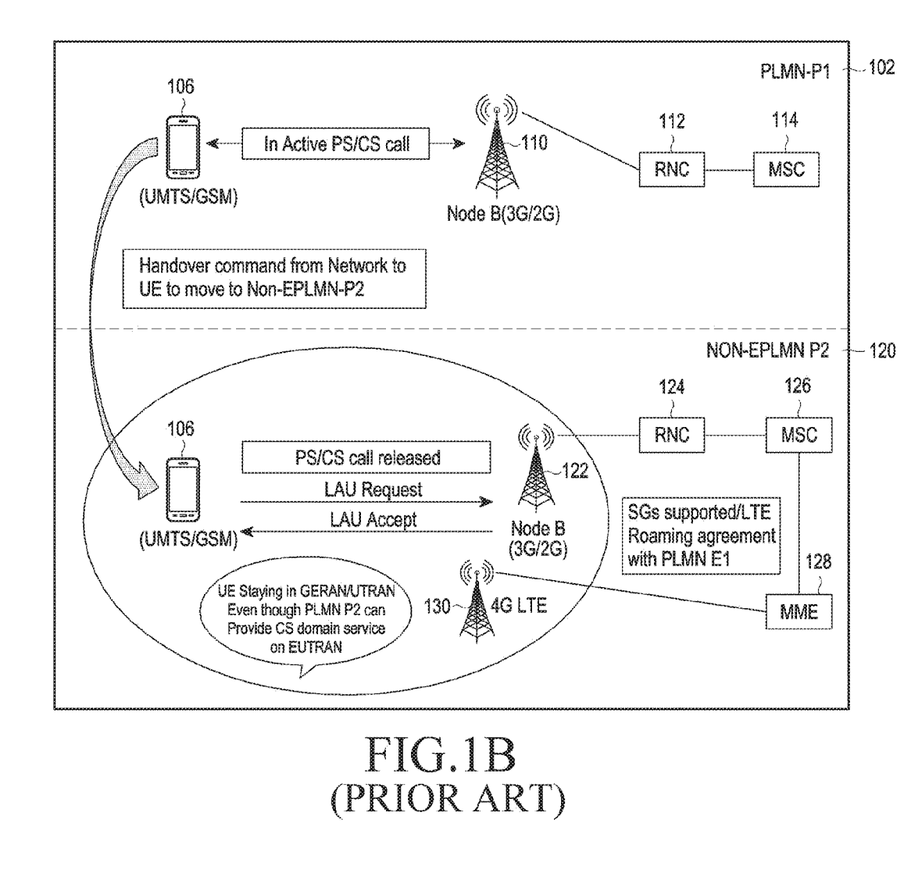

When the PS/CS session is ongoing, the PLMN P1 102 sends a handover (HO) command to the UE to move to a non-equivalent PLMN, say P2 (120) as shown in FIG. 1b. The UE 106 establishes the PS/CS session with the PLMN P2 120 via 2G/3G RAT 122 of the PLMN P2 120 upon successful HO to the PLMN P2 120. However, even after the PS/CS session is ended in the PLMN P2 120, the UE 104 continues to remain in the 2G/3G RAT 122 even though the PLMN P2 120 is capable of providing CS services over E-UTRAN 130.

Figure 2A:
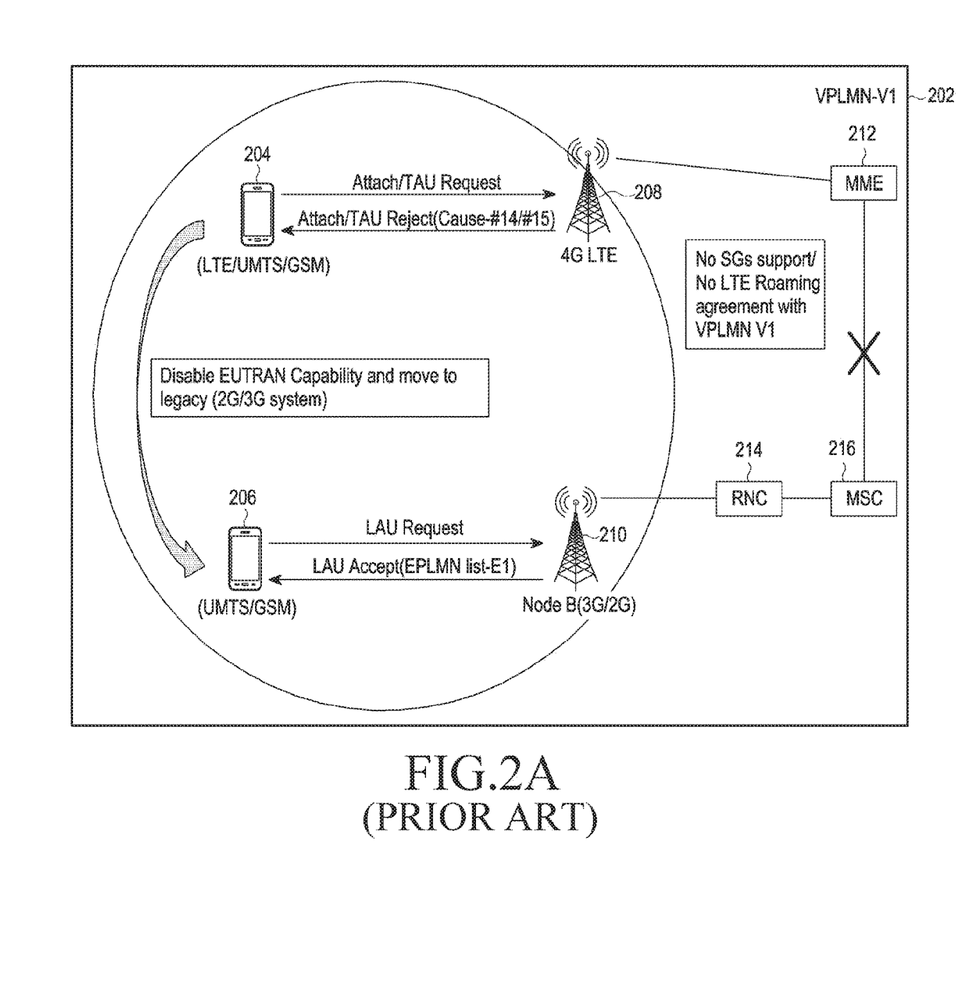
FIGS. 2a to 2c are schematic diagrams illustrating another exemplary problem scenario in which a UE disables a specific RAT capability, according to the related art.
Figure 2B:
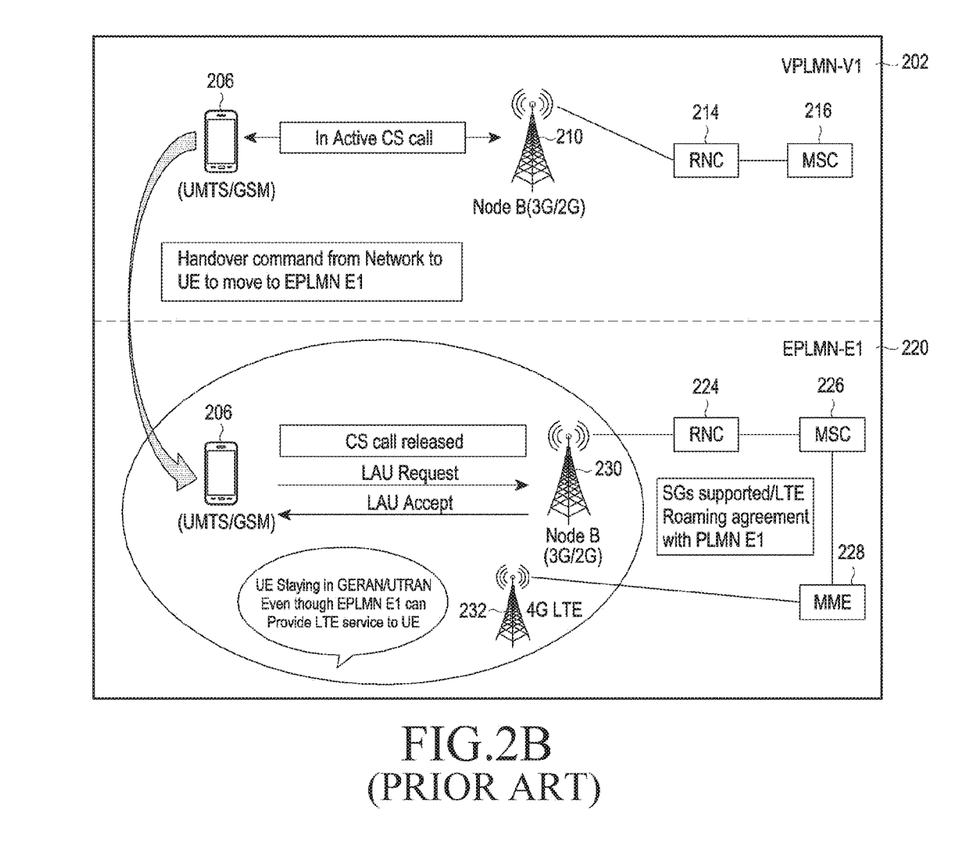
Figure 2C:
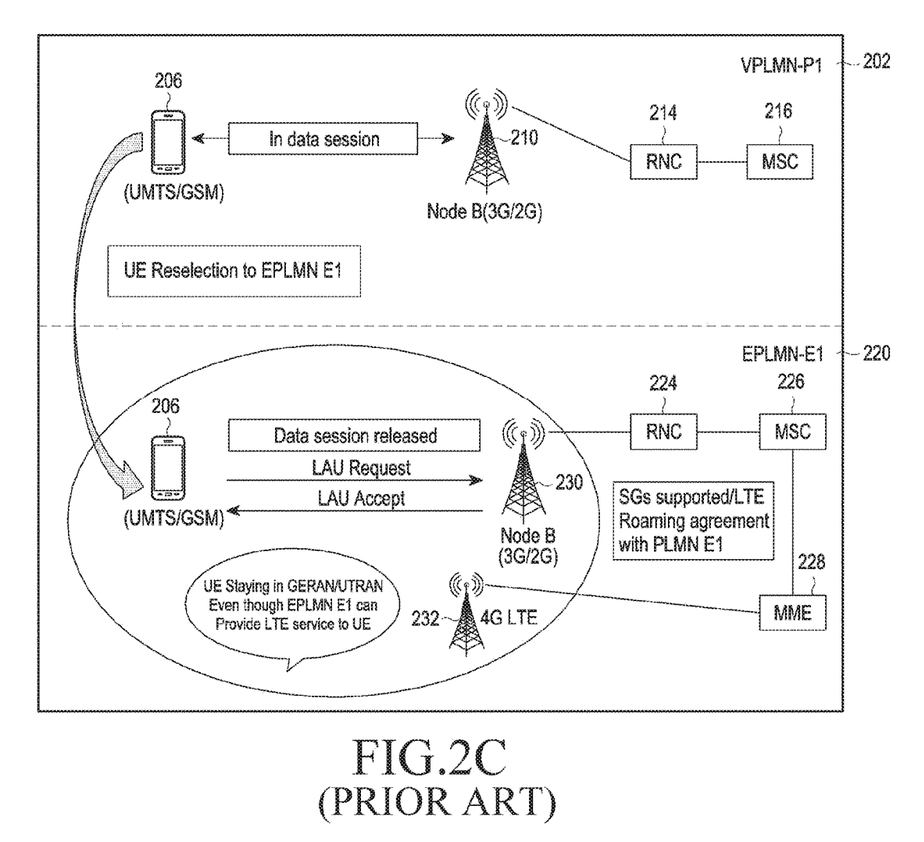

FIGS. 2a to 2c are schematic diagrams illustrating another exemplary problem scenario in which a UE disables a specific RAT capability, according to the related art. In this scenario, consider that the UE is capable of accessing plurality of RATs such as LTE, UMTS, and GSM. As shown in FIG. 2a, let us assume that the UE 204 camps on a visited PLMN (VPLMN), V1 (202) and sends an attach/TAU request message to VPLMN (V1) 202. Let us assume that the VPLMN (V1) 202 rejects the UE request message with cause #14 or #15, wherein cause #14 indicates EPS services are not available in the VPLMN and cause #15 says suitable cells for providing CS services are not available in the current tracking area. As a result of this, the UE 204 disables E-UTRAN capability and selects 2G/3G RAT 210 of the VPLMN (V1) 202 to establish a PS/CS session with the network. The UE receives an equivalent PLMN (EPLMN) list including E1 from the VPLMN (V1) 202 upon successful registration with the network. Meanwhile, the PS/CS session is ongoing, the UE receives a HO command to move to EPLMN E1 or UE can reselect to EPLMN (E1) as shown in FIGS. 2b and 2c. However, after the PS/CS session is released, the UE continues to remain in the 2G/3G network 230 even though the EPLMN E1 220 is capable of providing CS services over E-UTRAN 232.

In view of the foregoing, there is a need for a novel method for managing E-UTRAN capability of a UE during the movement to a different PLMN.

SUMMARY

An aspect of the present disclosure provides a method of managing evolved universal mobile telecommunication system (UMTS) terrestrial radio access network (E-UTRAN) capability during mobility of a user equipment (UE). The method comprises of: switching, by the UE, from a first radio access technology (RAT) to a second RAT associated with if the first RAT fails to provide circuit switched (CS) services to the UE, the first RAT and the second RAT being associated with a first public landline mobile network (PLMN), establishing, by the UE, a CS call session with the second RAT upon switching to the second RAT, receiving, by the UE, a network handover command to move from the first PLMN to a second PLMN, performing, by the UE, a movement from the first PLMN to the second PLMN and connecting with a third RAT associated with the second PLMN to continue the CS call session, and enabling, by the UE, the E-UTRAN capability after moving to the second PLMN to connect with a fourth RAT available in the second PLMN.

According to one embodiment of the present disclosure, switching from the first RAT to the second RAT associated with the first PLMN comprises of: sending, by the UE, a request message using the first RAT associated with the first PLMN for availing the CS services from the first RAT, receiving, by the UE, a response for the request message using the first RAT, wherein the response indicates that the first RAT is unable to provide the CS services to the UE in the first PLMN, disabling, by the UE, the E-UTRAN capability in the first RAT, when the first RAT fails to provide the CS services in the first RAT, and switching, by the UE, from the first RAT to the second RAT associated with the first PLMN.

According to one embodiment of the present disclosure, each of the first RAT and the third RAT is related to a long term evolution (LTE) network, and each of the second RAT and the fourth RAT is related to a second generation/third generation (2G/3G) network.

According to one embodiment of the present disclosure, the first PLMN is one of a home public landline mobile network (HPLMN) and a visited PLMN network.

According to one embodiment of the present disclosure, the second PLMN is one of the following: an equivalent PLMN (EPLMN), a non-equivalent PLMN (non-EPLMN), and a visited PLMN (VPLMN).

According to one embodiment of the present disclosure, the request message corresponds to one of an ATTACH message and a tracking area update (TAU) message.

According to one embodiment of the present disclosure, the method further comprises of receiving, by the UE, a reject message using the first RAT if the UE camped on the first PLMN, switching, by the UE, from the first RAT to the second RAT upon receiving the reject message, establishing, by the UE, a packet switched (PS)/CS session with the second RAT after registration with the second RAT, wherein the second RAT provides a list of PLMNs including details of the second PLMN, performing, by the UE, a movement to continue the PS/CS session with the third RAT, and enabling, by the UE, the E-UTRAN capability after moving to the second PLMN to connect with the fourth RAT.

According to one embodiment of the present disclosure, the first PLMN is different from a home PLMN to which the UE is initially connected for obtaining evolved packet system (EPS) services from the home PLMN.

According to one embodiment of the present disclosure, the reject message is received due to absence of roaming agreement between the home PLMN and the first PLMN.

According to one embodiment of the present disclosure, the PS/CS session comprises at least one of a CS call and a data packet session.

According to one embodiment of the present disclosure, the method further comprises of receiving, by the UE, a response indicating that the first PLMN fails to provide a PS or CS session based on condition in the first PLMN, disabling, by the UE, the E-UTRAN capability and establishing the PS or CS session with the second RAT, performing, by the UE, a movement from the first PLMN to the second PLMN if the PS or CS session is ongoing to obtain EPS services from the second PLMN, establishing, by the UE, the PS or CS session with the third RAT, determining, by the UE, whether the second PLMN is equivalent to the first PLMN after moving to the second PLMN, and continuing, by the UE, to remain in the third RAT without enabling the E-UTRAN capability, if the second PLMN is equivalent to the first PLMN.

According to one embodiment of the present disclosure, establishing a PS/CS session with the second RAT, the method comprises of: sending, by the UE, an update request message using the second RAT present in the first PLMN, and receiving, by the UE, a response to the update request message along with a list of PLMNs including the details of the second PLMN.

According to one embodiment of the present disclosure, the method further comprises of disabling, by the UE, the E-UTRAN capability for a duration of time, if the UE reaches a maximum counter value to attach with the first RAT, selecting, by the UE, the second RAT to avail evolved packet system (EPS) services while the E-UTRAN capability is disabled, establishing, by the UE, a PS or CS session with the second RAT, performing, by the UE, a movement from the first PLMN to the second PLMN to continue the PS or CS session with the second PLMN, establishing, by the UE, the PS or CS session with the third RAT, determining, by the UE, whether the second PLMN is equivalent to the first PLMN after moving to the second PLMN, and continuing, by the UE, to remain in the third RAT without enabling the E-UTRAN capability, if the second PLMN is equivalent to the first PLMN.

According to one embodiment of the present disclosure, the E-UTRAN capability is disabled in the first RAT due to one or more issues faced by the first RAT comprises at least one of: CS fallback (CSFB) feature is unavailable in the first PLMN, non-availability of cells in a tracking area of the first RAT, an SMS service alone available in the first PLMN, and unable to receive a response message from a first core network if a counter value to attach with the first PLMN reaches maximum value.

Another aspect of the present disclosure provides a user equipment (UE), the UE comprises of a transmitter and a receiver for transmitting and receiving data, a memory comprising an evolved universal mobile telecommunication system (UMTS) terrestrial radio access network (E-UTRAN) capability, and a processor operatively connected to the transmitter and receiver and the memory and is adapted for: switching, from a first radio access technology (RAT) to a second RAT associated with a first public landline mobile network (PLMN) when the first RAT fails to provide circuit switched (CS) services to the UE, establishing a CS call session with the second RAT upon switching to the second RAT, receiving a network handover command to move from the first PLMN to a second PLMN, initiating a movement from the first PLMN to the second PLMN to continue the CS call session with a second RAT associated with the second PLMN, and enabling, by the UE, the E-UTRAN capability after moving to the second PLMN to connect with a first RAT available in the second PLMN.

The foregoing has outlined, in general, the various aspects of the disclosure and is to serve as an aid to better understanding the more complete detailed description which is to follow. In reference to such, there is to be a clear understanding that the present disclosure is not limited to the method or application of use described and illustrated herein. It is intended that any other advantages and objects of the present disclosure that become apparent or obvious from the detailed description or illustrations contained herein are within the scope of the present disclosure.

BRIEF DESCRIPTION OF THE DRAWINGS

The above and other aspects, features, and advantages of the present disclosure will be more apparent from the following detailed description, taken in conjunction with the accompanying drawings, in which.

Although specific features of the present disclosure are shown in some drawings and not in others, this is done for convenience only as each feature may be combined with any or all of the other features in accordance with the present disclosure.

DETAILED DESCRIPTION

Hereinafter, various embodiments of the present disclosure are described with reference to the accompanying drawings. However, it should be understood that there is no intent to limit the present disclosure to the particular forms disclosed herein; rather, it is intended that the present disclosure should be construed to cover various modifications, equivalents, and/or alternatives of embodiments of the present disclosure.

The present disclosure provides a method for managing evolved universal mobile telecommunication system (UMTS) terrestrial radio access network (E-UTRAN) capability of a user equipment (UE). In the following detailed description of an embodiments of the present disclosure, reference is made to the accompanying drawings that form a part hereof, and in which are shown by way of illustration specific embodiments in which the present disclosure may be practiced. These embodiments are described in sufficient detail to enable those skilled in the art to practice the present disclosure, and it is to be understood that other embodiments may be utilized and that changes may be made without departing from the scope of the present disclosure. The following detailed description is, therefore, not to be taken in a limiting sense, and the scope of the present disclosure is defined only by the appended claims.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features, integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Throughout the document, the terms "first RAT" and "LTE RAT" are interchangeably used. Similarly, the terms "second RAT" and "2G/3G RAT" are interchangeably used.

An embodiment of the present disclosure describes a method of managing E-UTRAN capability of a UE. According to the embodiment of the present disclosure, if the UE moves to a public landline mobile network (PLMN) which is not a registered PLMN, nor an equivalent PLMN, and optionally not the PLMN memorized by UE for which E-UTRAN capability is disabled, then the UE enables the E-UTRAN capability if evolved packet system (EPS) services are available in that PLMN network. However, the UE may not enable the E-UTRAN capability if the reason for disabling of E-UTRAN capability is due to UE initiated detach procedure for EPS services only.

Figure 3A:
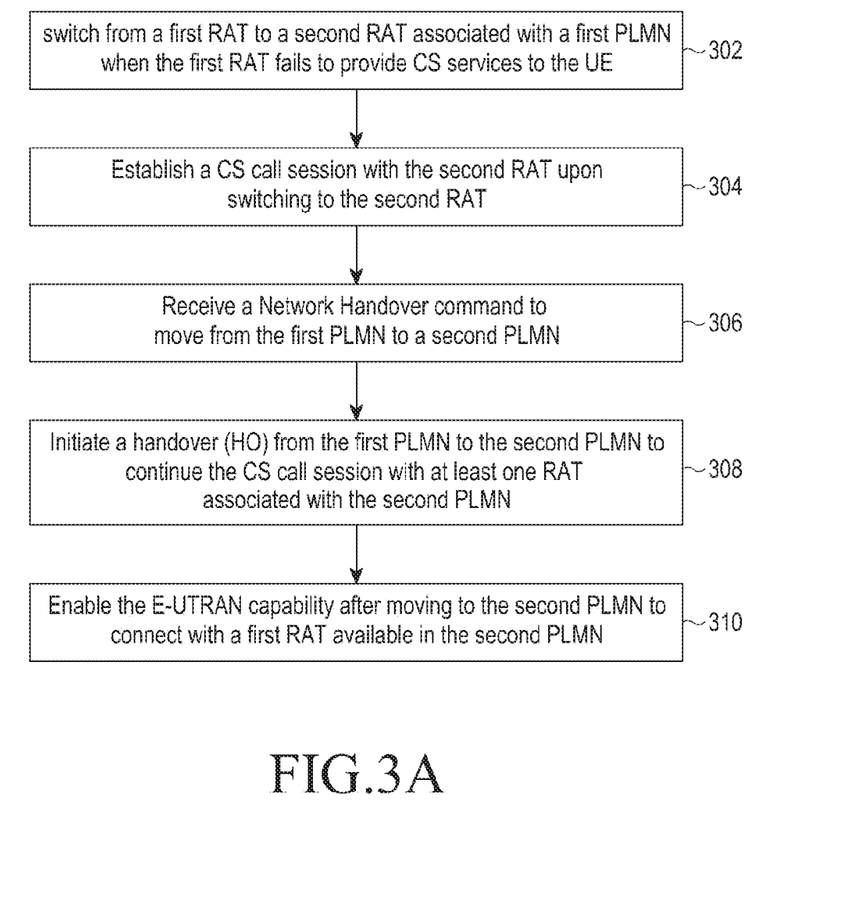
FIGS. 3a and 3b are flowchart diagrams illustrating a method of managing E-UTRAN capability of a user equipment mobility of a user equipment, according to an embodiment of the present disclosure.
Figure 3B:
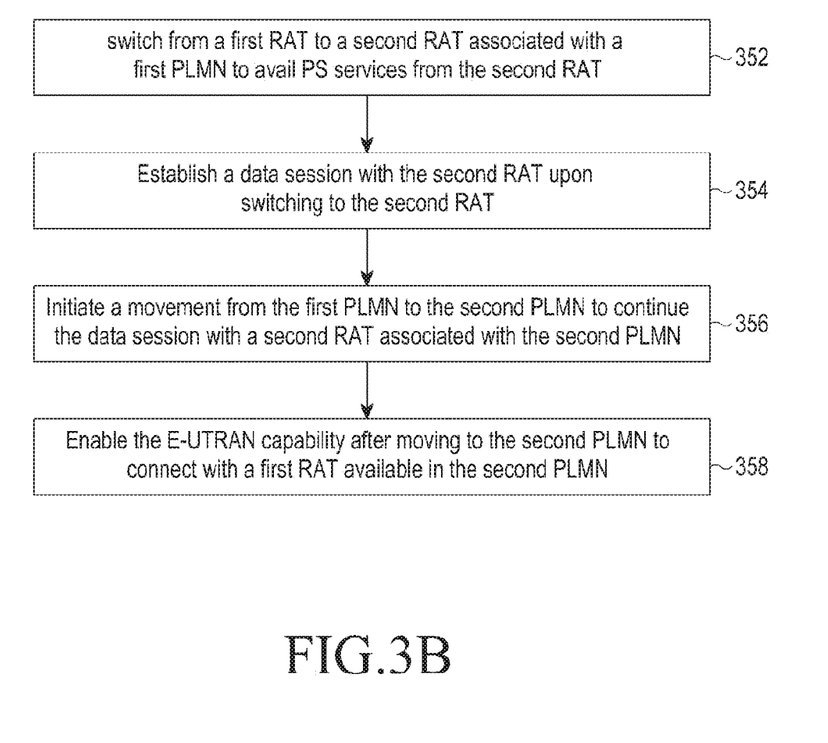

FIGS. 3a and 3b are flowchart diagrams illustrating a method of managing E-UTRAN capability during mobility of a UE, according to an embodiment of the present disclosure. At step 302, the UE is switched from a first radio access technology (RAT) to a second RAT associated with a first PLMN when the first RAT fails to provide circuit switched (CS) services to the UE. The CS services include at least one of a short message service (SMS) or a CS call. At step 304, a CS call session is established with the second RAT upon switching to the second RAT. At step 306, a Network Handover command is received by the UE to move from the first PLMN to a second PLMN. At step 308, a movement from the first PLMN to the second PLMN is initiated by the UE to continue the CS call session with a second RAT associated with the second PLMN. Finally, at step, 310, the E-UTRAN capability is enabled after moving to the second PLMN to connect with a first RAT available in the second PLMN.

The UE can also perform reselection to move to a second PLMN in order to avail data services from the second PLMN. The step by step procedure is illustrated in FIG. 3b. As shown in FIG. 3b, at step 352, the UE is switched from a first radio access technology (RAT) to a second RAT associated with a first PLMN to avail PS services from the second RAT. At step 354, a data session is established with the second RAT upon switching to the second RAT. At step 356, a movement from the first PLMN to the second PLMN is initiated by the UE to continue the data session with a second RAT associated with the second PLMN. At step, 358, the E-UTRAN capability is enabled after moving to the second PLMN to connect with a first RAT available in the second PLMN.

Figure 4:
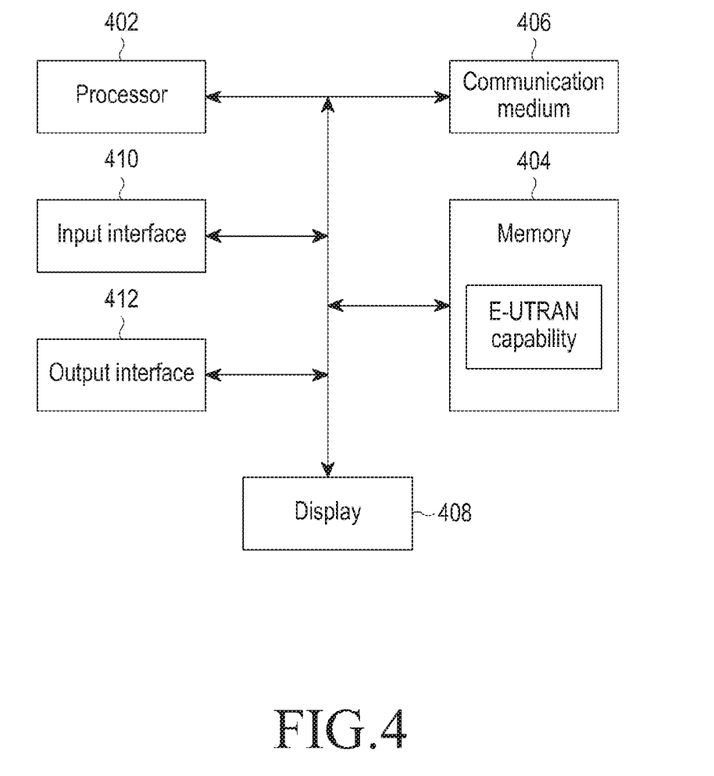
FIG. 4 is a block diagram illustrating one or more components of a user equipment, according to an embodiment of the present disclosure.

FIG. 4 is a block diagram illustrating one or more components of a UE, according to an embodiment of the present disclosure. The UE 400 comprises at least but not limited to a processor 402. The processor 402 is coupled to a communication interface 406, a display 408, an input interface 410, a memory unit 404, and an output interface 412. The processor 402 may also include a controller. The processor 402 may include a micro-controller, a North Bridge, a South Bridge, a field programmable array (FPGA), a programmable logic device (PLD), an application specific integrated circuit (ASIC), or other similar device, or a combination thereof. The processor 402 may also include a central processing unit (CPU) or a programmable general purpose or special purpose microprocessor, a digital signal processor (DSP), a graphics processing unit (GPU), an application specific integrated circuit (ASIC), a programmable logic device (PLD), or other similar device or a combination thereof, which is used for processing all tasks of the exemplary user equipment and would execute functions related to the present disclosure.

The communication interface 406 could include components such as a protocol unit which support signal transmissions of a long term evolution (LTE), a global system for mobile communication (GSM), a General Packet Radio Service (GPRS), a personal handy-phone system (PHS), a code division multiple access (CDMA) system, a wireless fidelity (Wi-Fi) system or a worldwide interoperability for microwave access (WiMAX). The communication interface 406 would also provide wireless access for the user equipment 400 by including components at least but not limited to a transmitter circuit and a receiver circuit.

The display 408 could include a touch screen and may contain a display such as a liquid crystal display (LCD), a light-emitting diode (LED) display, a field emission display (FED) or other types of display. The input interface 410 could be, for example, an input device such as a mouse, a keyboard, a joystick, a wheel, and so forth. The memory unit 305 could be volatile or permanent memories which would store buffered or permanent data such as the attach attempt counter or compiled programming codes used to execute functions of the exemplary mobile electronic device. The memory unit also comprises of an E-UTRAN capability enabler which enables E-UTRAN capability of the UE under the situations illustrated in FIGS. 5 to 6b. The output interface 412 may include a speaker, LEDs, and etc.

Figure 5:
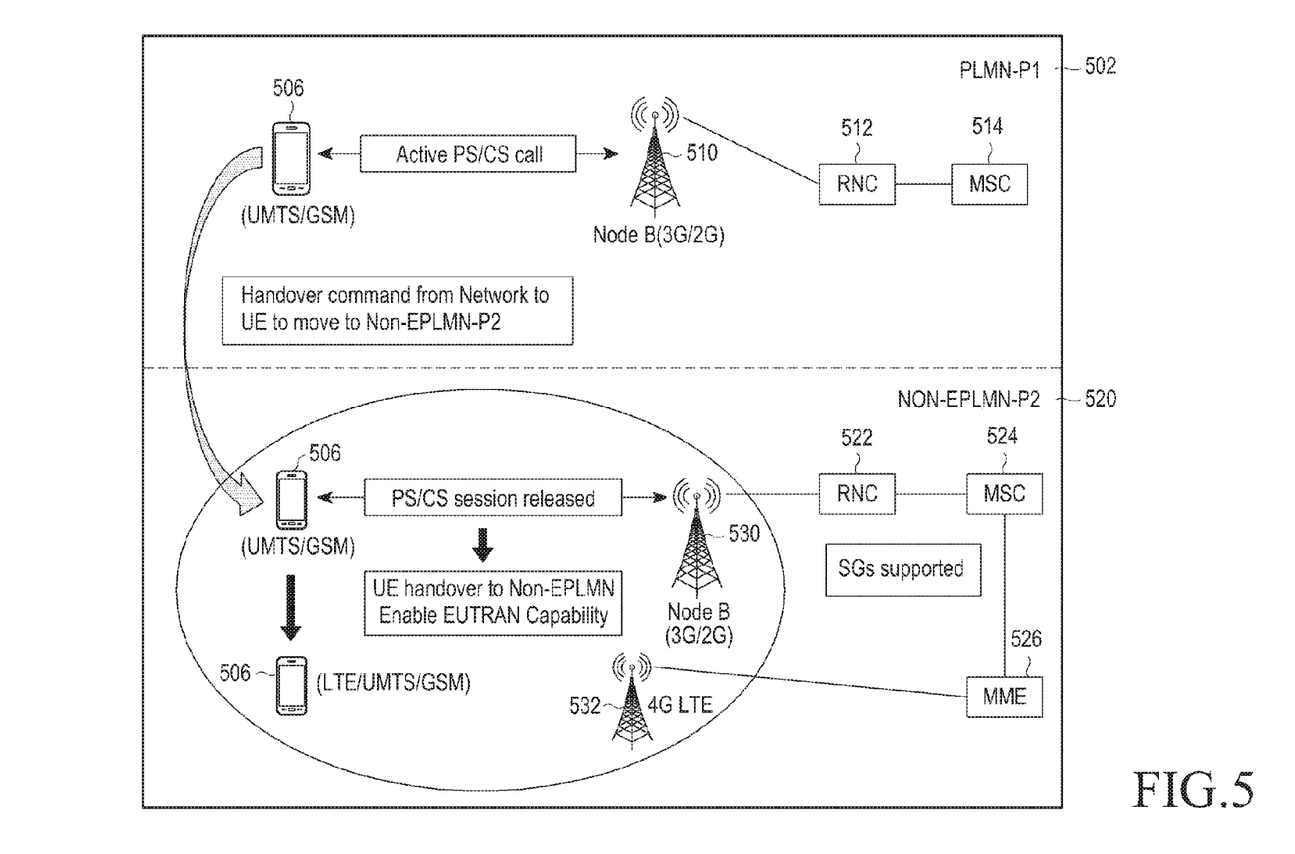
FIG. 5 is a schematic diagram illustrating a method of managing E-UTRAN capability of a user equipment during mobility of a user equipment, according to an embodiment of the present disclosure.

FIG. 5 is a schematic diagram illustrating a method of managing E-UTRAN capability of a UE, according to an embodiment of the present disclosure. The problem scenario as explained in FIG. 1 is addressed here. In the embodiment of the present disclosure, consider that the UE 506 is connected to a 2G/3G RAT 510 to receive CS services from a PLMN P1 (502). The 2G/3G RAT 510 is connected to the PLMN P1 (502) via network elements such as radio network controller (RNC 512) and mobile switching center (MSC 514). As shown in FIG. 5, when a PS/CS session is ongoing, the UE 506 receives a network handover command to move from PLMN (P1) (502) to non-equivalent PLMN (P2) (520). The UE performs the handover to non-EPLMN (P2) (520) and attaches with the 2G/3G RAT 530 of the non-EPLMN (P2) (520). The UE 506 considers the handover command received from the PLMN (P1) as a trigger to enable the E-UTRAN capability of the UE. Therefore, after moving to the non-EPLMN (P2), the UE enables its E-UTRAN capability to connect with LTE RAT 532 available in the non-EPLMN (P2) (520).

Figure 6A:
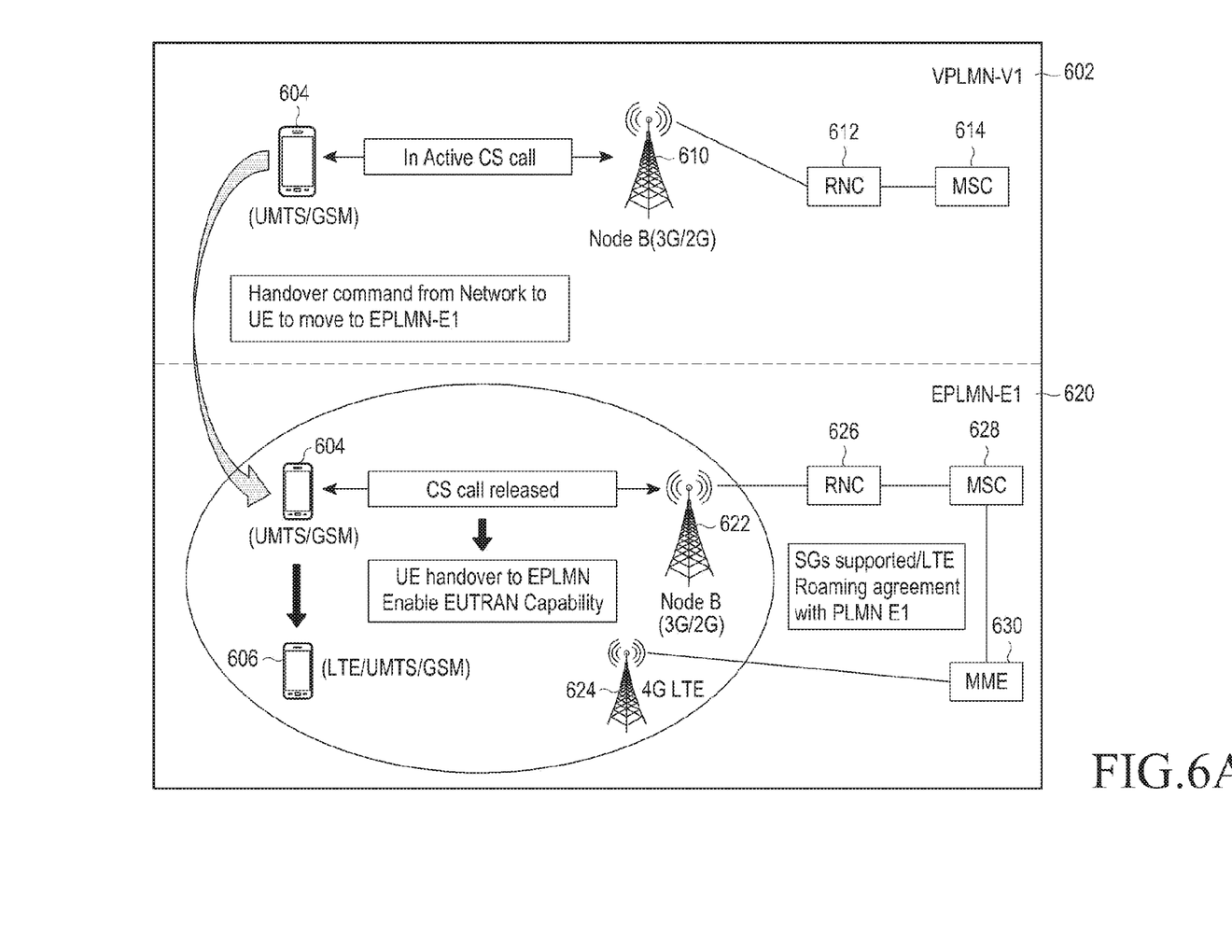
FIGS. 6a and 6b are schematic diagrams illustrating a method of managing E-UTRAN capability of a user equipment during mobility of a user equipment, according to an another embodiment of the present disclosure.
Figure 6B:
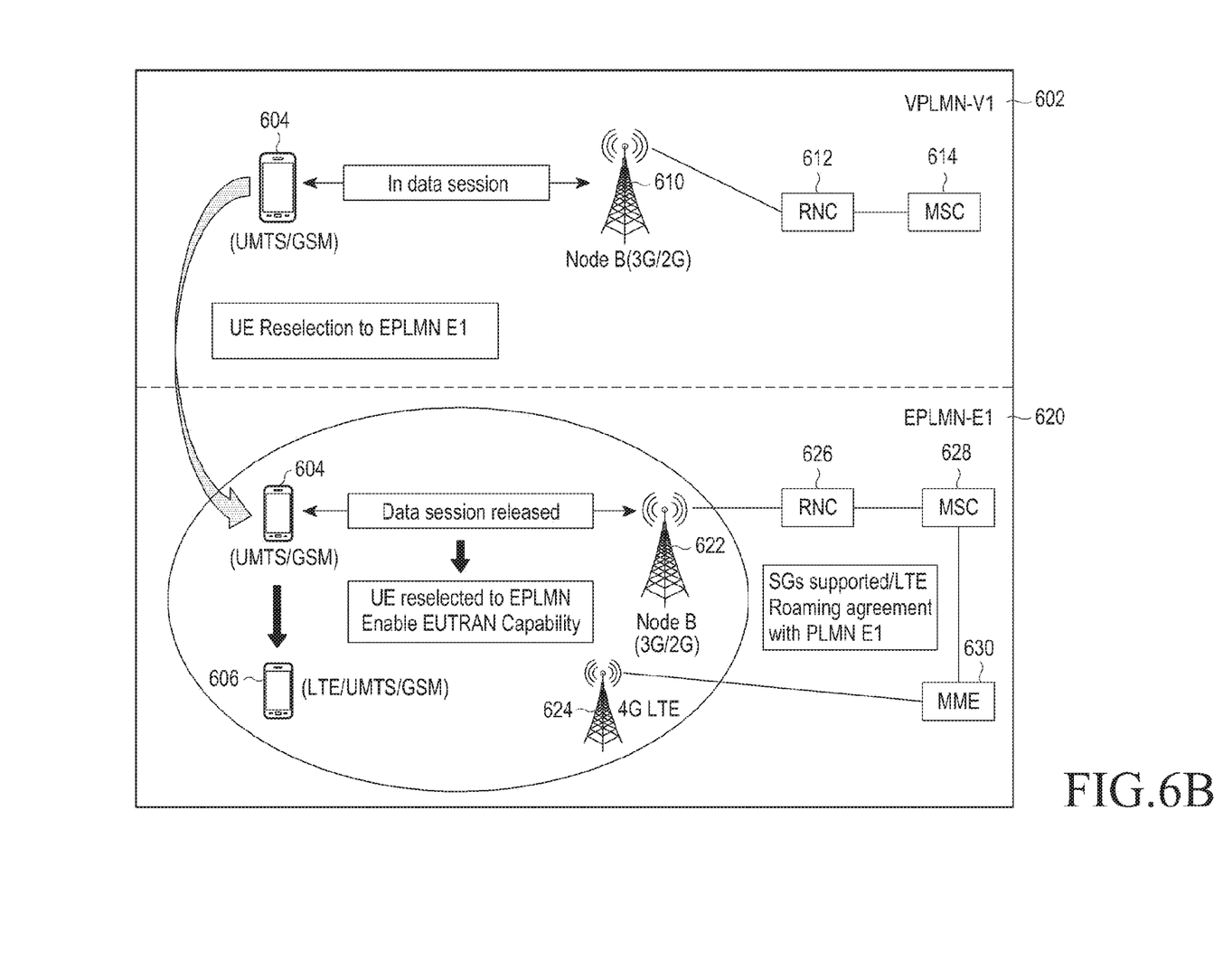

FIGS. 6a and 6b are schematic diagrams illustrating a method of managing E-UTRAN capability during mobility of a UE, according to an embodiment of the present disclosure. In the embodiment of the present disclosure, the UE 606 is capable of operating in plurality of networks including LTE, GSM and UMTS and the UE 604 is capable of operating in UMTS and GSM.

The problem scenarios as mentioned in FIGS. 2a to 2c are addressed here. As mentioned in FIGS. 2a and 2b, the UE has the capability to access E-UTRAN capability and camps on a visited PLMN (V1). The UE performs an attach/tracking area update request. In response to the request message, the UE receives attach/tracking area update reject message from the VPLMN (V1) with cause #14 or cause #15. The cause #14 indicates that EPS services are not allowed in the VPLMN (V1), whereas cause #15 indicates that suitable cells are not available in that tracking area. In the embodiment of the present disclosure, the VPLMN (V1) does not have roaming agreement with a home PLMN (HPLMN). Under these situations, the UE disables E-UTRAN capability and selects 2G/3G RAT of the VPLMN (V1) network to continue either CS call or data session with the 2G/3G RAT of the VPLMN (V1).

In case of CS call, as shown in FIG. 6a, when the UE 604 is connected to the VPLMN (V1) via the 2G/3G RAT 610 after disabling the E-UTRAN capability, the UE performs a network handover to an equivalent PLMN network (E1) (620) to continue the CS call with the 2G/3G RAT 622 of the EPLMN (E1) network 620. Upon moving to the EPLMN (E1) 620, the UE 604 enables E-UTRAN capability to connect with the LTE RAT 624 of the EPLMN (E1) to avail enhanced packet system services from the LTE RAT 624.

Similarly, for a data session, as shown in FIG. 6b, when the UE is connected with 2G/3G RAT 610 of the VPLMN (V1) (602) network, after disabling E-UTRAN capability, performs reselection to EPLMN (E1) (620) network to continue data session with the 2G/3G RAT (622) of the EPLMN (E1) (620) network. In an embodiment of the present disclosure, the UE 604 considers either the network handover command or reselection performed by the UE as a trigger to enable the E-UTRAN capability. Thus, the UE enables E-UTRAN capability after moving to the EPLMN (E1) to connect with LTE RAT 624 available in the EPLMN (E1) (620) to avail enhanced packet system services from the LTE RAT 624. A person having ordinary skills in the art understands the functions of network elements such as MME 630, RNC 626 and MSC 628 and hence not explained herein in detail.

Although the embodiments herein are described with various specific embodiments, it will be obvious for a person skilled in the art to practice the present disclosure with modifications. However, all such modifications are deemed to be within the scope of the claims. It is also to be understood that the following claims are intended to cover all of the generic and specific features of the embodiments described herein and all the statements of the scope of the embodiments which as a matter of language might be said to fall there between.

The invention claimed is:

1. A method of managing evolved universal mobile telecommunication system (UMTS) terrestrial radio access network (E-UTRAN) capability during mobility of a user equipment (UE), the method comprising steps of:
   switching, by the UE, from a first radio access technology (RAT) to a second RAT if the first RAT fails to provide circuit switched (CS) services to the UE, the first RAT and the second RAT being associated with a first public landline mobile network (PLMN);
   establishing, by the UE, a CS call session with the second RAT upon switching to the second RAT;
   receiving, by the UE, a network handover command to move from the first PLMN to a second PLMN;
   performing, by the UE, a movement from the first PLMN to the second PLMN and connecting with a third RAT associated with the second PLMN to continue the CS call session; and enabling, by the UE, the E-UTRAN capability after moving to the second PLMN to connect with a fourth RAT available in the second PLMN.

2. The method as claimed in claim 1, wherein switching from the first RAT to the second RAT comprises of:
sending, by the UE, a request message using the first RAT for availing the CS services from the first RAT;
receiving, by the UE, a response for the request message using the first RAT, wherein the response indicates that the first RAT is unable to provide the CS services to the UE in the first PLMN;
disabling, by the UE, the E-UTRAN capability in the first RAT based on the response; and
switching, by the UE, from the first RAT to the second RAT.

3. The method as claimed in claim 2, wherein the request message corresponds to one of an ATTACH message and a tracking area update (TAU) message.

4. The method as claimed in claim 1, wherein each of the first RAT and the third RAT is related to a long term evolution (LTE) network, and each of the second RAT and the fourth RAT is related to a second generation/third generation (2G/3G) network.

5. The method as claimed in claim 1, wherein the first PLMN is one of a home public landline mobile network (HPLMN) and a visited PLMN network.

6. The method as claimed in claim 1, wherein the second PLMN is one of the following:
an equivalent PLMN (EPLMN),
a non-equivalent PLMN (non-EPLMN), and
a visited PLMN (VPLMN).

7. The method as claimed in claim 1, further comprising:
receiving, by the UE, a reject message using the first RAT if the UE camped on the first PLMN;
switching, by the UE, from the first RAT to the second RAT upon receiving the reject message;
establishing, by the UE, a packet switched (PS)/CS session with the second RAT after registration with the second RAT, wherein the second RAT provides a list of PLMNs including details of the second PLMN;
performing, by the UE, a movement to continue the PS/CS session with the third RAT; and
enabling, by the UE, the E-UTRAN capability after moving to the second PLMN to connect with the fourth RAT.

8. The method as claimed in claim 7, wherein the first PLMN is different from a home PLMN to which the UE is initially connected for obtaining evolved packet system (EPS) services from the home PLMN.

9. The method as claimed in claim 7, wherein the reject message is received due to absence of roaming agreement between the home PLMN and the first PLMN.

10. The method as claimed in claim 7, wherein the PS/CS session comprises at least one of a CS call and a data packet session.

11. The method as claimed in claim 1, further comprising:
receiving, by the UE, a response indicating that the first PLMN fails to provide a PS or CS session based on condition in the first PLMN;
disabling, by the UE, the E-UTRAN capability and establishing the PS or CS session with the second RAT;
performing, by the UE, a movement from the first PLMN to the second PLMN if the PS or CS session is ongoing to obtain EPS services from the second PLMN;
establishing, by the UE, the PS or CS session with the third RAT;
determining, by the UE, whether the second PLMN is equivalent to the first PLMN after moving to the second PLMN; and
continuing, by the UE, to remain in the third RAT without enabling the E-UTRAN capability, if the second PLMN is equivalent to the first PLMN.

12. The method as claimed in claim 11, wherein establishing a PS/CS session with the second RAT associated with the first PLMN comprises of:
sending, by the UE, an update request message using the second RAT; and
receiving, by the UE, a response to the update request message along with a list of PLMNs including the details of the second PLMN.

13. The method as claimed in claim 1, further comprising:
disabling, by the UE, the E-UTRAN capability for a duration of time, if the UE reaches a maximum counter value to attach with the first RAT;
selecting, by the UE, the second RAT to avail evolved packet system (EPS) services while the E-UTRAN capability is disabled;
establishing, by the UE, a PS or CS session with the second RAT;
performing, by the UE, a movement from the first PLMN to the second PLMN to continue the PS or CS session with the second PLMN;
establishing, by the UE, the PS or CS session with the third RAT;
determining, by the UE, whether the second PLMN is equivalent to the first PLMN after moving to the second PLMN; and
continuing, by the UE, to remain in the third RAT without enabling the E-UTRAN capability, if the second PLMN is equivalent to the first PLMN.

14. The method as claimed in claim 13, wherein the condition comprises at least one of:
CS fallback (CSFB) feature is unavailable in the first PLMN,
non-availability of cells in a tracking area of the first RAT,
an SMS service alone available in the first PLMN, and
unable to receive a response message from a first core network if a counter value to attach with the first PLMN reaches a maximum counter value.

15. A user equipment (UE), comprising:
a transceiver;
a memory configured to store evolved universal mobile telecommunication system (UMTS) terrestrial radio access network (E-UTRAN) capability; and
a processor configured to:
switch from a first radio access technology (RAT) to a second RAT if the first RAT fails to provide circuit switched (CS) services to the UE, the first RAT and the second RAT being associated with a first public landline mobile network (PLMN),
establish a CS call session with the second RAT upon switching to the second RAT,
control the transceiver to receive a network handover command to move from the first PLMN to a second PLMN,
perform a movement from the first PLMN to the second PLMN and connect with a third RAT associated with the second PLMN to continue the CS call session, and
enable the E-UTRAN capability after moving to the second PLMN to connect with a fourth RAT available in the second PLMN.

16. The UE as claimed in claim 15, wherein the processor is further configured to:
   control the transceiver to send a request message using the first RAT for availing the CS services from the first RAT,
   control the transceiver to receive a response for the request message using the first RAT, wherein the response indicates that the first RAT is unable to provide the CS services to the UE in the first PLMN,
   disable the E-UTRAN capability in the first RAT based on the response, and
   switch from the first RAT to the second RAT.

17. The UE as claimed in claim 16, wherein the request message corresponds to one of an ATTACH message and a tracking area update (TAU) message.

18. The UE as claimed in claim 15, wherein each of the first RAT and the third RAT is related to a long term evolution (LTE) network, and each of the second RAT and the fourth RAT is related to a second generation/third generation (2G/3G) network.

19. The UE as claimed in claim 15, wherein the first PLMN is one of a home public landline mobile network (HPLMN) and a visited PLMN network.

20. The UE as claimed in claim 15, wherein the second PLMN is one of the following:
   an equivalent PLMN (EPLMN),
   a non-equivalent PLMN (non-EPLMN), and
   a visited PLMN (VPLMN).

\* \* \* \* \*